Sept. 7, 1954          A. E. KRAMER          2,688,322
COMPARTMENTED PRESSURE COOKER
Filed Dec. 7, 1950          2 Sheets-Sheet 1
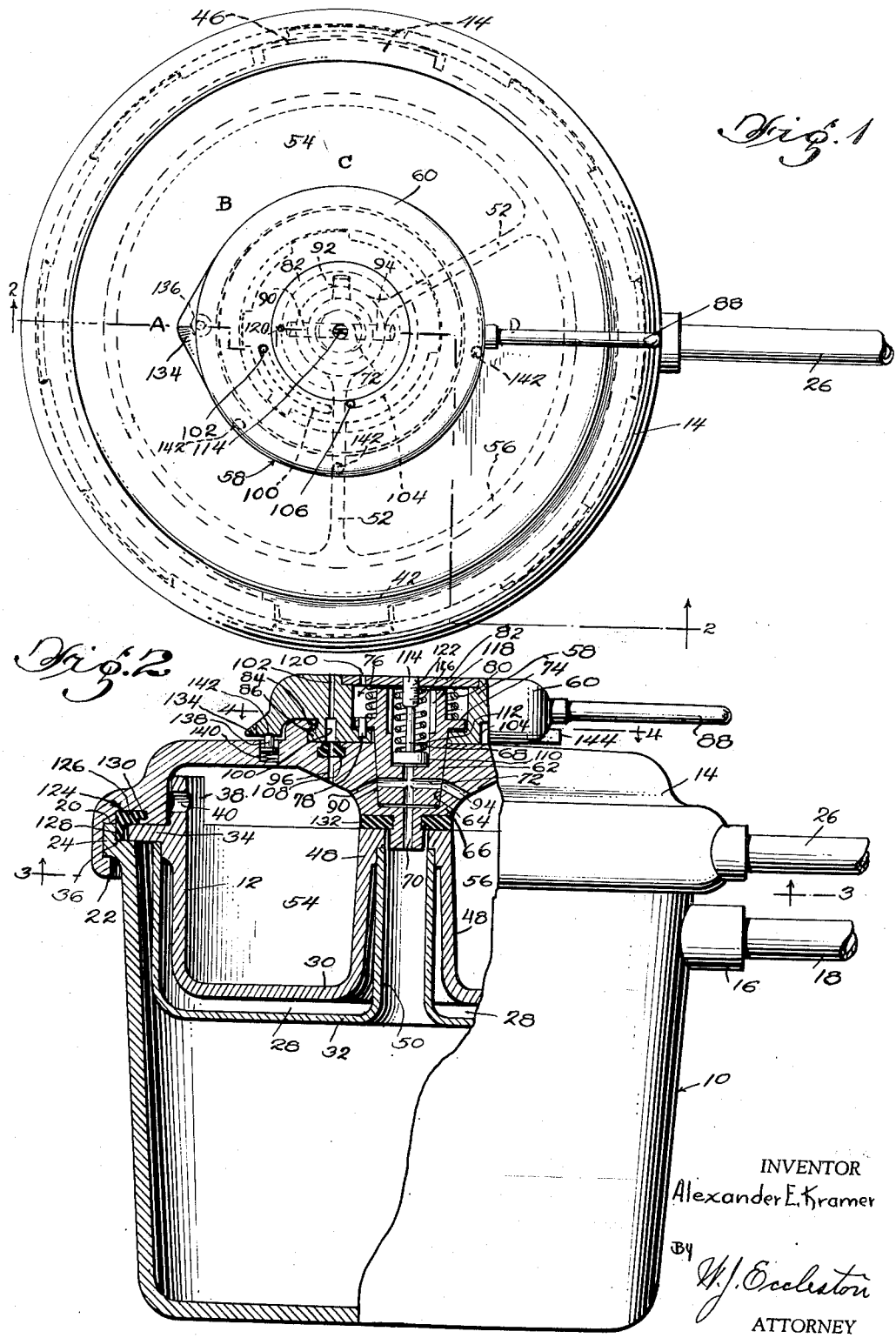
INVENTOR
Alexander E. Kramer
BY
W. J. Eccleston
ATTORNEY

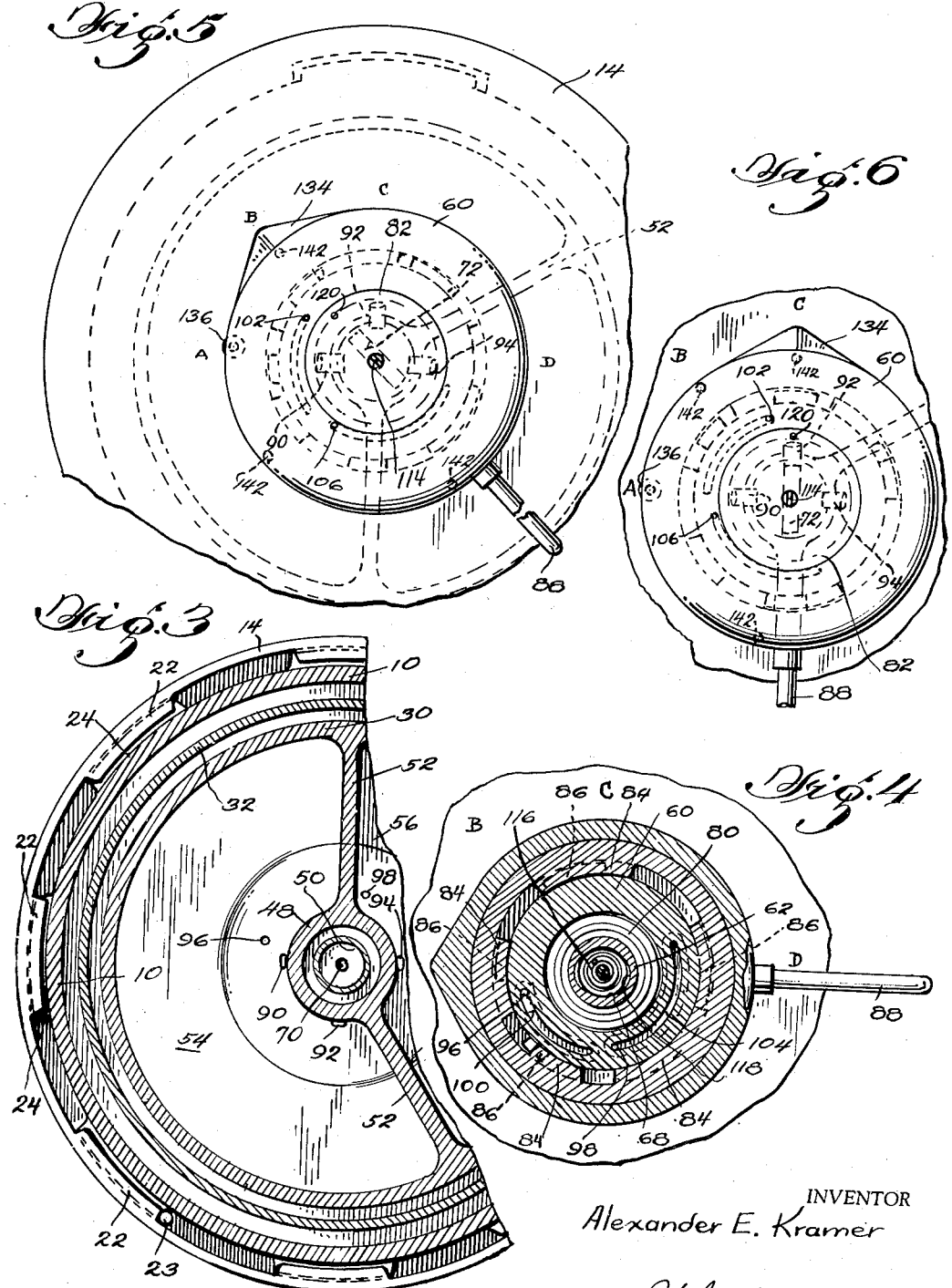

Patented Sept. 7, 1954

2,688,322

UNITED STATES PATENT OFFICE 2,688,322

COMPARTMENTED PRESSURE COOKER

Alexander E. Kramer, Hyattsville, Md.

Application December 7, 1950, Serial No. 199,695

27 Claims. (Cl. 126—369.3)

(Granted under Title 35, U. S. Code (1952), sec. 266)

The invention described herein, if patented, may be manufactured by or for the Government for governmental purposes without the payment to me of any royalty thereon.

The present invention relates to pressure cookers and more particularly to a compartmented pressure cooker in which the individual compartments other than the main steam generating compartment may be selectively subjected to steam under pressure.

In the attempts heretofore made to provide a compartmented pressure cooker a single receptacle has been used provided with a partitioning member to divide the interior of the receptacle into a plurality of compartments or a number of relatively small receptacles or vessels have been housed in a single larger receptacle. In either case, the separate compartments are in constant communication so that they are subjected to steam under pressure simultaneously and for the same period of time when the cooker is in use. With these arrangements, quick cooking foods, such as peas or carrots, will be done long before slower cooking foods, such as meats. Thus, with the available pressure cookers, it is impossible to place all of the usual components of a meal in the cooker and cook each of the various items to the proper degree. The unique feature of the pressure cooker of the present invention is the fact that the application of steam under pressure to the individual compartments may be controlled, so that foods requiring different cooking times may be cooked simultaneously in the cooker each to the proper degree.

Accordingly, an object of the invention is to provide a new and improved compartmented pressure cooker in which the individual compartments are sealed from each other and steam under pressure may be applied to the compartments selectively.

Another object of the invention is to provide a new and improved pressure cooker having a plurality of compartments sealed from each other and means including a single valve to bring two or more of the compartments into communication while venting the other compartments to the atmosphere.

A further object of the invention is to provide a new and improved compartmented pressure cooker in which the compartments are adapted to be sealed from each other and selectively to be brought into communication with each other and in which passages for intercommunicating the individual compartments and a valve selectively to control intercommunication between the compartments are in the cover of the cooker.

A still further object of the invention is to provide a compartmented pressure cooker as set forth in the preceding object in which the control valve may readily be removed from the cover or replaced and in which the passages are in a readily accessible position to facilitate cleaning of the cooker.

Yet another object of the invention is to provide a new and improved compartmented pressure cooker so constructed that the mere act of locking the cover or closure on the cooker seals the compartments from each other.

Another object of the invention is to provide a new and improved compartmented pressure cooker in which compartments are formed in part by nestable inner and outer vessels so that by removing the inner vessel from the outer a single compartment pressure cooker of relatively large volume is provided.

A more general object of the invention is to provide a new and improved compartmented pressure cooker which is simple in construction and therefor both inexpensive to manufacture and easy to use but which nevertheless is durable and reliable.

These and other objects, advantages and capabilities of the invention will become apparent from the following description wherein reference is had to the accompanying drawings in which:

Figure 1 is a top plan view of the improved pressure cooker of the present invention;

Figure 2 is a view generally on the line 2—2 of Fig. 1 showing the pressure cooker of the present invention partly in side elevation and partly in vertical section with the valve and valve-operating member at one position of adjustment;

Figure 3 is a fragmentary horizontal sectional view taken on line 3—3 of Fig. 2;

Figure 4 is a fragmentary horizontal sectional view taken on line 4—4 of Fig. 2;

Figure 5 is a fragmentary top plan view showing the control valve for the pressure cooker and the operating member at a position of adjustment different from that shown in Fig. 1; and Figure 6 is a view similar to Fig. 5 showing the valve and valve-operating member at still another position of adjustment.

The present application is a continuation-in-part of my copending application Serial No. 754,954, filed June 16, 1947, entitled "Domestic Cookers" and now abandoned. The combined pressure relief valve and pressure indicating device disclosed herein is claimed in my copending application for patent Serial No. 423,003, filed April 13, 1954.

Referring to the drawings and more particularly to Fig. 2, it will be noted that the pressure cooker of the present invention comprises a main or outer vessel or receptacle 10, an inner vessel or receptacle 12 nestable in the outer vessel and a closure or cover 14 all of which may be cast or otherwise formed from aluminum, an aluminum alloy or any other suitable material and which are sufficiently sturdy in construction to withstand considerable steam pressure. The outer vessel 10 which is of conventional generally cylindrical pot-like shape is provided with an integral handle boss 16 near its upper edge to which is fixed a handle 18 of suitable heat insulating material, while the cover 14 is dished on its underside and has an annular radially extending flange 20 on its underside adjacent its outer periphery. This flange 20 seats over part of its width on the flat upper peripheral edge of vessel 10.

Oppositely disposed uniformly spaced locking lugs or teeth are provided respectively, on the upper peripheral edge of the outer vessel 10 and the inner periphery of the cover 14 for releasably locking the cover upon the outer vessel. The lugs on the cover are numbered 22 (Fig. 3) and extend radially inwardly, while those on the vessel which are numbered 24 extend radially outwardly. Preferably, the lugs 22 on the cover are somewhat shorter in end to end length than the length of the spaces between the lugs 24 on the vessel so that the cover may be placed upon the vessel in a preliminary closing position at one relative angular position of the vessel and cover. Upon relative rotational movement of the vessel and cover after placement of the latter in this preliminary closing position, the lugs 22 on the cover engage under the lugs 24 on the vessel and thus wedge or cam the cover to locked position as shown in Fig. 2. To facilitate this inter-engagement of the locking lugs, the leading edge of the lugs 22 on the cover may be beveled or the opposed inter-engaging edges of the lugs on both the cover and vessel may be beveled.

It will be noted that the cover 14 is provided with a handle 26 so that it may more readily be manipulated. This handle preferably is similar to the handle 18 on the vessel 10 and is so located that it lies above the handle 18 in vertical alignment therewith when the cover is in locked position on the vessel and thus serves to indicate the fact that the cover is properly locked in position in addition to facilitating handling of the cover when it is removed from the vessel and handling of the pressure cooker when the cover is on the vessel. If desired, a stop or abutment 23 (Fig. 3) may be provided on the outer vessel against which one of the lugs 22 on the closure engages to limit rotational movement of the closure in a locking direction.

For a purpose to be described subsequently, the inner vessel 12, hereinafter designated a pan for convenience in nomenclature, preferably is thermally insulated between its inner and outer sides. In the pan shown in Fig. 2, this thermal insulation is provided by a dead-air space 28 formed between inner and outer walls 30 and 32, respectively. These walls are sealed together adjacent their upper edges to thus form a unitary structure. Pan 12 has a radially outwardly projecting flange 34 adjacent its upper edge which seats upon the horizontal side of a shoulder 36 in the outer vessel 10 to support the pan therein.

Upwardly projecting lugs 38 are provided at diametrically opposite points on the pan 12, and these lugs are provided with apertures 40 to thus form handles facilitating placement of this pan in the outer vessel 10 or its removal therefrom. For a purpose which will appear hereinafter, the pan 12 and vessel 10 must nest at a specific relative angular position. This is assured by providing outwardly projecting positioning lugs 42 and 44 (Fig. 1) on the pan 12 for engaging in complementary recesses or seats 46 in the upper edge of vessel 10. By making these lugs 42 and 44 of different lengths proper positioning of the pan 12 in vessel 10 is assured.

Centrally located in the pan 12 is a cylindrical thermal insulating axially extending wall 48 (Fig. 2) defining an axially extending passage 50 through the pan. The annular space or compartment thus formed in the pan is divided into compartments by suitable partitions 52 (Figs. 1 and 3) extending radially between the central annular wall 48 and the inner side 30 of the side wall of the pan 12. For the purpose of illustration, pan 12 is shown divided into two compartments 54 and 56 of unequal size. It will be apparent therefore that the pressure cooker has a total of three compartments, since the space in the outer vessel 10 below the pan 12 constitutes a compartment by itself. In practice when additional volume is required, the pan 12 may be removed from vessel 10 and the latter used alone as an ordinary pressure cooker.

In accordance with one of the features of the invention communication between the three compartments is controlled by a valve 58 (Fig. 2) carried by a valve-operating member 60 rotatably secured upon the cover 14. The valve 58 comprises a hollow frusto-conical plug 62 which seats in a complementary valve seat 64 in a centrally located boss 66 on the underside of cover 14. In addition to a variable diameter axially extending bore comprising cylindrical passages 68 and 70, the valve plug 62 has a diametrically extending passage 72 intersecting axial passage 70.

Adjacent its upper end the valve plug 62 has an external annular rib or flange 74 which is adapted to be loosely received in a cylindrical recess or well 76 in the outer side of valve-operating member 60. The valve and operating member 60 are locked against relative rotation by a pin 78 fixed in the bottom of well 76 and projecting loosely through an aperture in the flange 74 on the valve so that the valve and its operating member are relatively movable in an axial direction but not rotationally. The flange 74 does not seat on the bottom of well 76 nor does the inner end of valve plug 62 engage the bottom of valve seat 64 when the parts are in operative position so that a spring 80 reacting between the upper side of flange 74 and a cover plate 82 fixed in the outer end of the well 76 biases the valve 62 to seated position in the valve seat 64.

A connection between the valve-operating member 60 and the upper side of the cover or closure 14 to provide for relative rotation of these parts is provided by inter-engaging lugs 84 and 86 (Fig. 4) on the top side of the closure and the underside of the valve-operating member, respectively. The lugs 84 on the closure 12 which are spaced upwardly from the plane of the closure (Fig. 2) project inwardly while the lugs 86 on the valve-operating member 60 project outwardly.

In order to allow for relative movement of the valve and closure through approximately 180° as required to satisfy all conditions of use of the pressure cooker, four lugs preferably are provided on the closure and the valve-operating member, and these lugs are of variable length in an end to end direction and are variably spaced from each other. Referring to Fig. 4 which shows the length and position of the lugs 84 and 86, with respect to the closure and operating member respectively, it will be seen that the lugs 86 on the valve-operating member 60 correspond in position relative to each other to the relative position of the spaces between the lugs 84 on the closure 14, and therefor, at one position of the operating member, i. e., at approximately 45° counterclockwise from its position as shown in Figs. 1 and 4, the lugs on either one of these parts will be aligned with the spaces in the other. Furthermore, the lugs are slightly shorter in end to end length than the spaces with which they mate, thus allowing the operating member 60 to be engaged upon closure 14 in a preliminary position with the lugs 86 on the operating member lying below and between the lugs 84 on the closure.

It will be observed that by reason of the relative end to end dimensions and spacing of the lugs 84 and 86 that portions of the lugs will be in interlocking engagement when the operating member 60 is turned clockwise to the position shown in Figs. 1 and 4 so that the operating member will be located on closure 14 but will be free to rotate relative thereto. For the same reason at least portions of substantially diametrically opposed pairs of lugs 84 and 86 will be in interlocking engagement at any angular position of the operating member throughout the clockwise advance of this member at least to a position 180° in advance of the position indicated in Fig. 1 as shown in Figs. 4 to 6. Thus, an operating connection has been provided between the valve-operating member 60 and closure 14 to adapt these parts for relative rotational movement through 180°, yet the parts may be disconnected readily, if desired.

In order to facilitate initial inter-engagement of lugs 84 and 86, the leading edge of one set of these lugs may be beveled so that the parts are cammed into locking engagement upon initial rotation of the operating member 60 from its disconnecting position. Rotation of the operating member 60 is facilitated by a handle 88 fixed thereto and of the same material as handles 18 and 26 on the vessel and closure.

By rotating the valve 58 the diametrical passage 72 therein may be brought into and out of communication with one or more of a plurality of radially extending passages 90, 92, and 94 (Figs. 1, 3, 5, and 6) extending through the boss 66 from the valve seat 64. Passages 90 and 94 are diametrically aligned while passage 92 is disposed in a plane normal to the plane of passages 90 and 94.

As previously explained, vessel 10 and pan 12 are nested at a specific relative angular position by the use of positioning lugs 42 and 44 so that the compartments 54 and 56 in the pan are at the position indicated in Fig. 1. It is to be noted that compartment 54 is thus in communication with the valve seat 64 through passages 90 and 92, while compartment 56 is in communication with the valve seat through passage 94 only. The purpose of this arrangement will appear hereinafter.

In addition to these passages opening into the compartments 54 and 56 vent ports 96 and 98 (Figs. 2 and 3) are provided in the closure 14 for compartments 54 and 56, respectively. These vent ports are spaced at different radial distances from the axis of operating member 60 and open in an area of the upper side of the closure 14 overlaid by a portion of the operating member when the parts are in assembled relation so that the latter may be utilized to control communication through these vent ports.

Referring to Figs. 2 and 4, it will be seen that the operating member 60 is provided on its underside with an arcuate groove 100 of less than 90° in end to end length. This groove is formed on a radius corresponding in length to the distance from the axis of the operating member 60 to vent port 96 so that this vent port and arcuate groove will remain in communication while the operating member and valve are advanced clockwise through somewhat less than 90° from the position shown in Figs. 1 and 4. Since the arcuate groove 100 communicates with the atmosphere through a vent port 102 in operating member 60, the compartment 54 will be vented to the atmosphere whenever arcuate groove 100 overlies vent port 96 in the closure 14.

A second arcuate groove 104 is provided in the underside of the operating member 60. This groove is vented to the atmosphere through a port 106 and is centered to communicate with the vent port 98 for the small compartment in the pan 12. Groove 104 is greater than 90° in end to end length for a purpose which will appear hereinafter.

A fluid-tight seal between arcuate grooves 100 and 104 and the vents 96 and 98, respectively, is formed by providing a gasket or valve seat for these vent ports of heat and moisture resistant synthetic rubber-like material. The seat for vent port 96 is shown at 108 in Fig. 2, and as indicated, it may be designed to be resiliently held in position.

When the pressure cooker is being used, steam is generated in the outer vessel 10, and to limit the maximum pressure which may be built up therein the novel combined safety and pressure indicating valve disclosed in Fig. 2 has been devised. This valve includes a head 110 which has a fluid-tight but reciprocable fit in the cylindrical portion 68 of the bore in valve plug 62 so that it constitutes a piston. Projecting axially outwardly from this head is a stem 112 which is enlarged and flattened at its outer end as indicated at 114 in Figs. 1 and 2. This enlarged end 114 fits loosely in a circular opening in cover plate 82, and this valve assembly is biased toward the lowermost end of passage 68 by a spring 116 calibrated to yield predetermined amounts when subjected to predetermined pressures.

Inasmuch as the head 110 forms a fluid-tight seal with the passage 68 increase in the pressure in the vessel 10 above atmospheric causes the head 110 to rise in passage 68 against the resistance of the spring 116. At a predetermined pressure, the head 110 is moved into coextensive relation with longitudinally extending grooves 118 in the inner wall of passage 68 whereupon the steam escapes through these grooves and to the exterior around stem 112 or into well 76 and to the exterior through a port 120 in cover plate 82. Normally a spring will be used which is designed to yield sufficiently so that steam will be by-passed through grooves 118 when the pressure in the cooker exceeds 15 pounds per sq. in. Graduations 122 are provided on the outer enlarged end 114 of the stem 112 to cooperate with the outer side of cover plate 82 in indicating the pressure to which the valve head 110 is being subjected at any time.

By virtue of its construction the valve 62 also forms an emergency safety valve for the cooker in case the normal safety relief fails to function as it should. The spring 80 biasing valve plug 62 to seated position is calibrated to yield at a predetermined pressure above the pressure at which steam by-passes valve head 110. It will be apparent therefor that in the presence of an excessive pressure in the cooker, valve plug 62 will be lifted from its seat against the resistance of spring 80, and steam will therefor escape into well 76 and from the well to the exterior through the port 120 in the cover plate or the opening into which the head 114 of the relief valve extends. Thus, a novel valve has been provided which functions both to indicate the pressure and to relieve that pressure when it exceeds a predetermined maximum.

To function as desired, it is necessary that the compartments in the pan 12 be sealed from each other and from the outer vessel. This is accomplished by providing a gasket 124 (Fig. 2) of synthetic rubber-like or other heat resistant moisture-proof resilient material between the cover 14 and the two vessels 10 and 12. The gasket 124 which is fixed to the cover includes an outer annular part 126 having a depending flange 128 which engages against the vertical side of shoulder 36 in vessel 10 and a horizontal flange 130 which engages the top side of annular flange 34 on the pan 12 when the cover 14 is closed. Upon locking of the cover on the vessel 10 a preliminary seal is formed between the cover and the two vessels and between the latter and the exterior by this annular portion of the gasket, and since the depending flange 128 on the gasket is subjected to the pressure in vessel 10, it will be pressed with increasing force against the vertical side of shoulder 36 as the steam pressure increases, thus increasing the effectiveness of the seal when the cooker is being used.

In addition to the annular portion 126, the gasket also includes a central annular part 132 received in an external peripheral slot in the lower end of the boss 66 on the underside of cover 14. This annular part forms a seal between the top of annular wall 48 in the pan 12 and the cover when the latter is locked in closed position. Radiating from the center part 132 to the outer annular portion 126 are rib-like portions to form a seal between the partitions 52 in the pan 12 and corresponding partitions depending from the underside of the cover 14. Thus, it will be seen that the compartments 54 and 56 in the pan 14 are completely sealed from each other and from the interior of vessel 10 when the cover 14 is closed so that communication therebetween can occur only through the passages in valves 58 and the passages in boss 66.

Briefly to describe the operation of the pressure cooker, it will be assumed that components of a meal requiring different cooking times have been placed in the compartment formed by the vessel 10 and the compartments 54 and 56 in the pan 12 and that sufficient water is present in the vessel to generate the steam required for cooking. It should be noted that the component requiring the longest cooking time should be placed in vessel 10, since this vessel is subjected to steam pressure throughout the cooking operation.

Initially, the valve-operating member 60 is turned to a position at which an indicator 134 thereon registers with the mark A on the topside of closure 14 as indicated in Fig. 1. At this position of the parts, the vessel 10 is in communication with both compartments 54 and 56 through valve passages 70 and 72 and passages 90, 92, and 94 in the boss on closure 14 (Figs. 1 and 2). In addition, both compartments 54 and 56 are vented to the atmosphere since the arcuate grooves 100 and 104 communicate with their respective vent ports 96 and 98.

After the cooker has been purged, operating member 60 may be turned clockwise from its initial position through a 45° angle bringing the pointer 134 into registration with the mark B on the topside of the closure 14 as indicated in Fig. 5. At this position of the parts, the diametrical passage 72 in the valve is out of communication with passages 90, 92 and 94 in the boss 66 so that the steam generated in the main or outer vessel 10 is confined therein and thus soon builds up to the pressure at which the release valve 110 is set to open. In view of the fact that both arcuate grooves 100 and 104 are longer than 45° compartments 54 and 56 continue to be vented to the atmosphere. Cooking will thus proceed in the vessel 10 only when the valve operating member is at this position.

From the last-described position the operating member 60 may be advanced clockwise an additional 45° until the indicator 134 registers with the mark C on the closure 14 as indicated in Fig. 6. Since arcuate groove 100 is less than 90° in end to end length, vent port 96 for large compartment 54 will be closed to the atmosphere by the operating member 60, but small compartment 56 will still be vented to the atmosphere because groove 104 is more than 90° in end to end length. At this position of the parts one end of diametrical passage 72 in valve 62 communicates with passage 92 in boss 66 on the closure 14 so that steam under pressure is admitted to large compartment 54 in pan 12 from the outer vessel 10 and cooking thus proceeds simultaneously in compartment 54 and in vessel 10.

To subject both compartments 54 and 56 to steam under pressure, the valve-operating member 60 is advanced clockwise until the indicator 134 registers with the mark D on the closure 14 which is 180° advanced from the initial position. At this position both vent ports 96 and 98 are closed to the atmosphere and diametrical passage 72 in valve 62 is in communication with the opposite radial passages 90 and 94 in the boss 66 on closure 14. Thus, steam is admitted to both compartments in the pan 12 from the outer vessel 10 and cooking proceeds in all the compartments in the pressure cooker.

After cooking has been completed, the cooker may be cooled by the use of cold water in the usual manner. Any residual pressure in the cooker may be released before the cover 14 is unlocked by returning the valve 62 to its initial position so that compartments 54 and 56 are vented to the atmosphere and the vessel 10 vented through these compartments.

In Fig. 2 a detent 136 is shown comprising a spring pressed pin 138 housed in a recess 140 in the topside of the closure 14 and projecting upwardly therefrom. This pin has a rounded outer end which is adapted to seat in one of a plurality of semi-spherical recesses 142 in the underside of operating member 60. One of these recesses is aligned with the indicator 134 and the others are spaced in a counterclockwise direction from the indicator at intervals corresponding respectively to the distances between the stations A to D. As a result when the operating member 60 is turned in a clockwise direction, the rounded end of pin 138 will snap into one of these recesses when the indicator arrives at any one of the stations, and the user of the cooker will be apprised of the arrival of the operating member at a particular position by a clicking sound and by the fact that the detent tends to resist further movement of the operating member. However, since the pressure exerted by the detent 136 is relatively slight, the operating member 60 may readily be released therefrom by the application of slight additional pressure to the handle 88.

The detent 136 may be made to serve the additional function of limiting movement of the valve-operating member 60 in a clockwise direction to the 180° cycle just described. For this purpose, the valve operating member is provided with a radially projecting stop 144 to engage the side of detent 136 as the operating member 60 arrives at a position 180° in advance of the position shown in Fig. 1 and thus limits further forward movement of the operating member so that the latter cannot accidentally be moved to the position at which it can be released from closure 14. Suitable releasable means may be provided if desired to prevent counterclockwise movement of the operating member 60 from the position shown in Fig. 1.

From the above description of the construction and operation of the pressure cooker of the present invention, its many advantages will become apparent. Since the compartments are sealed from each other by the mere act of locking the cover in position on the outer vessel and a single valve controls both intercommunication between the compartments and venting thereof, the cooker is simple and easy to use. Furthermore, a single combined relief and pressure indicating valve limits the pressure which may be built up in each of the individual compartments and also indicates the pressure therein. As previously explained, if a pressure cooker of large volume is desired, this may be had by removing the pan from the outer vessel and using the outer vessel as an ordinary pressure cooker.

When it is desired to clean the cooker, this may readily be done because the valve and its operating member are easily removed from the closure or replaced, and the passage in the closure through which the compartments are intercommunicated being in the boss on its underside, are readily accessible.

While a preferred embodiment of the invention has been shown and described, it will be apparent that numerous variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. A pressure cooker comprising a main compartment and a subsidiary compartment mounted within the main compartment and supported in the upper portion thereof, a cover for the main compartment, sealing means adapted simultaneously to seal said main compartment and said subsidiary compartment whereby said main compartment and said subsidiary compartment are adapted to withstand a substantial super-atmospheric pressure and said subsidiary compartment is sealed from said main compartment, and a valve in said cover adapted to connect said main compartment and said subsidiary compartment with each other.

2. A pressure cooker comprising a main compartment and a subsidiary compartment mounted within the main compartment and supported in the upper portion thereof, a cover for the main compartment, sealing means in said cover adapted simultaneously to seal said main compartment and said subsidiary compartment whereby said main compartment and said subsidiary compartment are adapted to withstand a substantial super-atmospheric pressure and said subsidiary compartment is sealed from said main compartment, and a valve in said cover adapted to connect said main compartment and said subsidiary compartment with each other.

3. A pressure cooker comprising a main compartment and a plurality of subsidiary compartments mounted within the main compartment and supported in the upper portion thereof, a cover for said main compartment, sealing means in said cover adapted simultaneously to seal said main compartment and said subsidiary compartments whereby said main compartment and said subsidiary compartments are adapted to withstand a substantial super-atmospheric pressure and said subsidiary compartments are sealed from said main compartment and from each other, and a valve in said cover adapted selectively to connect said main compartment with said subsidiary compartments.

4. A pressure cooker comprising a main compartment and a plurality of subsidiary compartments mounted within the main compartment and supported in the upper portion thereof, a cover for said main compartment, sealing means in said cover adapted simultaneously to seal said main compartment and said subsidiary compartments whereby said main compartment and said subsidiary compartments are adapted to withstand a substantial super-atmospheric pressure and said subsidiary compartments are sealed from said main compartment and from each other, and means on said cover adapted selectively to connect said main compartment and said subsidiary compartments with the atmosphere.

5. A pressure cooker comprising a main compartment and a plurality of subsidiary compartments mounted within the main compartment and supported in the upper portion thereof, a cover for said main compartment, sealing means in said cover adapted simultaneously to seal said main compartment and said subsidiary compartments whereby said main compartment and said subsidiary compartments are adapted to withstand a substantial super-atmospheric pressure and said subsidiary compartments are sealed from said main compartment and from each other, a valve in said cover adapted selectively to connect said main compartment with said subsidiary compartment, and valve operating means on said cover for operating said valve selectively to connect said main compartment with said subsidiary compartments and with the atmosphere.

6. A pressure cooker comprising a main compartment and a plurality of subsidiary compartments mounted within the main compartment and supported in the upper portion thereof, said subsidiary compartment being provided with insulating means to limit the flow of heat from the main compartment to the subsidiary compartments, a cover releasably lockable upon said main compartment, and sealing means in said cover rendered operative in response to locking of said cover on said main compartment simultaneously to seal said main compartment and said subsidiary compartments whereby said main compartment and said subsidiary compartments are adapted to withstand a substantial super-atmospheric pressure and said subsidiary compartments are sealed from said main compartment and from each other.

7. A pressure cooker comprising a vessel, means for defining a plurality of compartments in said vessel, a closure releasably lockable on said vessel, means to form a fluid tight seal between the individual compartments and between the compartments and the exterior when the closure is locked in closed position, means including a valve operable selectively to establish communication between said compartments and selectively to isolate the same from intercommunication, and exhaust vent means for said compartments including a valve selectively to control communication between the separate compartments and said vent means.

8. A pressure cooker comprising a vessel, means for defining a plurality of compartments in said vessel, a closure releasably lockable on said vessel, means to form a fluid tight seal between the individual compartments and between the compartments and the exterior when the closure is locked in closed position, means including a valve operable selectively to establish communication between said compartments and selectively to isolate the same from intercommunication, and means for venting said compartments including means selectively to vent the separate compartments and a pressure responsive relief valve operable automatically to prevent the accumulation of pressure in any of said compartments beyond a predetermined maximum value.

9. A pressure cooker comprising a vessel, means for defining a plurality of compartments in said vessel, a closure releasably lockable on said vessel, means to form a fluid tight seal between the individual compartments and between the compartments and the exterior when the closure is locked in closed position, means including a valve operable to a plurality of predetermined positions selectively to establish communication between the individual compartments, and exhaust vent means for said compartments including a valve conjointly operable with the valve controlling communication between the compartments simultaneously to vent all of said compartments or to vent only those of said compartments not in communication with each other.

10. A pressure cooker comprising a vessel, means for defining a plurality of compartments in said vessel, a closure releasably lockable on said vessel, means to form a fluid tight seal between the compartments and between the compartments and the exterior when the closure is locked in closed position, means including a valve operable to a plurality of predetermined positions selectively to establish communication between the individual compartments and selectively to vent the compartments to the atmosphere, and means to indicate the presence of the valve at said predetermined positions including means operable automatically releasably to restrain said valve at each of said predetermined positions.

11. A pressure cooker comprising inner and outer nestable vessels, a closure releasably lockable upon said outer vessel, means to seal the compartments formed by said vessels from each other and the atmosphere in a fluid tight manner when the closure is locked in closed position, means including a valve operable selectively to establish communication between the compartments defined by said vessels or to isolate the compartments from intercommunication, and exhaust vent means for said vessels including a valve to control communication between said exhaust vent means and the separate compartments selectively.

12. A pressure cooker as defined in claim 11, wherein said inner vessel has walls including a thermal insulating portion to prevent direct conduction of heat therethrough from said outer vessel to the inner side of said inner vessel.

13. A pressure cooker as defined in claim 11 wherein said inner vessel has spaced inner and outer walls sealed to each other to define a unitary vessel having a sealed thermal insulating dead air space between the said inner and outer walls thereof.

14. A pressure cooker comprising inner and outer nestable vessels, said inner vessel having partitions defining a plurality of compartments therein, a closure releasably lockable upon said outer vessel, means to seal the space in said outer vessel from the spaces in the compartments of the inner vessel and all of said spaces from the exterior in a fluid tight manner, means including a valve operable selectively to establish communication between the outer vessel and one or more of the compartments in the inner vessel, and means operable simultaneously to vent the spaces in both of said vessels or to vent only the compartments in said inner vessel not in communication with the outer vessel.

15. A pressure cooker comprising a vessel, means defining a plurality of compartments in the vessel, a closure releasably lockable on said vessel, said closure having a part thereon with passages formed therein for intercommunicating said compartments, means to seal the compartments from each other and the exterior in a fluid-tight manner when the closure is locked in closed position, a single valve in the closure selectively to control communication through said passages, and exhaust vent means in said closure for each of said compartments including a valve operable conjointly with said first-mentioned valve selectively to vent the compartments.

16. A pressure cooker comprising a vessel, means defining a plurality of compartments in the vessel, a closure releasably lockable on said vessel, said closure having a part thereon with passages formed therein for intercommunicating said compartments, means to seal the individual compartments from each other and the exterior in a fluid-tight manner when the closure is locked in closed position, a vent port in said closure for each compartment, and a single valve in the closure selectively to control communication through said passages and through said vent ports.

17. A pressure cooker comprising a vessel, means defining a plurality of compartments in the vessel, a closure releasably lockable on said vessel, said closure having a part thereon with passages formed therein for intercommunicating said compartments, means to seal the individual compartments from each other and the exterior in a fluid-tight manner when the closure is locked in closed position, vent ports in said closure for said compartments, a valve in the closure operable to a plurality of predetermined positions selectively to control communication through said passage and through said vent ports, and means to indicate the presence of the valve at said predetermined positions including means operable automatically releasably to restrain said valve at the predetermined positions to which it is movable.

18. A closure for a pressure cooker having a plurality of compartments adapted to be sealed from each other and the exterior when the closure is locked in closed position comprising a body adapted to form a cover for said cooker, said body having a plurality of passages formed therein for intercommunicating said compartments, vent ports in said closure for said compartments, a single valve in the closure operable to a plurality of positions selectively to control communication through said passages and through said vent ports, and means in the closure and valve including a spring pressed detent in one of said parts and recesses in the other brought into cooperating relation when the valve arrives at any of said predetermined positions releasably to hold the same at the said positions.

19. A closure for a pressure cooker having a plurality of compartments adapted to be sealed from each other and the exterior when the closure is locked in closed position comprising a body adapted to form a cover for said cooker, said body having a valve chamber formed therein and a plurality of passages to communicate each of said compartments and said valve chamber, a valve in said chamber selectively operable to establish communication between all of said passages or between a predetermined number of passages less than all, and exhaust vent means in said closure for each of said compartments including a valve operable conjointly with said first-mentioned valve selectively to open said vents.

20. A closure for a pressure cooker having a plurality of compartments adapted to be sealed from each other and the exterior when the closure for said cooker is locked in closed position comprising a body adapted to form a cover for said cooker, said body having a valve chamber formed therein and a plurality of passages to communicate each of said compartments and said valve chamber, a vent port in said closure for each compartment, a valve in said chamber selectively operable to establish communication between all of said passages or between a predetermined number of passages less than all, said valve including a part selectively to control communication through said vent ports, and a pressure responsive relief valve operable automatically to prevent the accumulation of pressure in any of said compartments beyond a predetermined maximum value.

21. A closure for a pressure cooker having a plurality of compartments adapted to be sealed from each other and the exterior when the closure is locked in closed position comprising a body adapted to form a cover for said cooker, said body having a cylindrical valve chamber formed therein and a plurality of passages to communicate said valve chamber and each of said compartments, vent ports in said closure for each compartment arcuately spaced around said valve chamber, and valve means including a plug type valve selectively rotatable in said chamber to establish communication between all of said passages or between a predetermined number of passages less than all, said valve means having a part extending radially from said plug and arcuate ports in said radially extending part centered on the axis of said valve to cooperate with the vent ports in said closure, said arcuate ports being arranged to vent all of said compartments or none at alternate positions of said valve, and at positions intermediate said alternate positions to vent one or more of said compartments but less than all.

22. A closure for a pressure cooker having a plurality of compartments adapted to be sealed from each other and from the exterior when the closure is locked in closed position, comprising a body adapted to form a cover for said cooker, said body having a valve seat formed thereon and a plurality of passages to communicate each of said compartments and said valve seat, the ends of said passages at said valve seat being arranged around a common center, and means to control the application of steam under pressure between said compartments including an operating member pivotally supported on said closure, a valve, means operatively to connect said valve and operating member for relative movement axially and to render the operating member effective to rotate said valve on an axis coinciding with said common center selectively to control communication between said passages, and yieldable means to bias said valve axially to seated position.

23. A closure for a pressure cooker having a plurality of compartments adapted to be sealed from each other and the exterior when the closure for said cooker is locked in closed position comprising a body adapted to form a cover for said cooker, said body having a valve seat formed thereon and a plurality of passages to communicate each of said compartments and said valve seat, the ends of said passages in said valve seat being arranged around a common center, and means to control the application of steam under pressure between said compartments including an operating member pivotally supported on said closure, a valve having a passage therein in constant communication with the source of steam for said compartments, means operatively to connect said valve and operating member for relative movement axially and to render the latter effective to rotate said valve on an axis coinciding with said common center selectively to control communication between said passages, yieldable means to bias said valve axially to seated position, and a pressure responsive relief valve in the passage in said control valve in constant communication with the steam operable automatically to prevent the accumulation of pressure in any of said compartments beyond a predetermined maximum value.

24. In a pressure cooker having a plurality of intercommunicating compartments adapted to be maintained sealed from each other and the exterior when the closure for said cooker is locked in closed position, a valve to control communication between said compartments, said valve having a plurality of bores including a bore extending axially therethrough a portion of which bore forms an inlet to said valve and which bore also includes a cylindrical part of uniform internal diameter intermediate the ends thereof, a piston valve having a head reciprocable in the said cylindrical part in fluid tight relation thereto so as to be responsive to the pressure in the inlet side of said axial bore, yieldable means to oppose movement of said piston valve under the influence of pressure on the inlet side of said bore, and a by-pass rendered effective upon a predetermined movement of the piston valve under the influence of pressure in the inlet side of said axial bore to relieve the pressure in the said axial bore to a predetermined maximum value.

25. In a pressure cooker having a plurality of intercommunicating compartments adapted to be maintained sealed from each other and the exterior when the closure for said cooker is locked in closed position, a combined relief valve and valve to control communication between said compartments, said valve having a plurality of bores formed therein including a bore extending axially therethrough a portion of which forms an inlet to said valve body and which bore also includes a cylindrical part of uniform internal diameter intermediate the ends thereof, a piston valve having a head reciprocable in the said cylindrical part in fluid tight relation thereto so as to be responsive to the pressure in said axial bore, yieldable means to oppose movement of said piston valve under the influence of pressure on the inlet side of said bore, and one or more grooves in the side wall of said cylindrical part of the bore to form a bypass around the head of said piston for relieving the pressure in the said inlet side of the bore when the pressure developed therein is sufficient to move the head of said valve into co-extensive relation with the groove.

26. A pressure cooker comprising a main compartment and a plurality of subsidiary compartments mounted within the main compartment and supported in the upper portion thereof, said subsidiary compartment being provided with insulating means to limit the flow of heat from the main compartment to the subsidiary compartments, a cover for said main compartment, sealing means in said cover adapted simultaneously to seal said main compartment and said subsidiary compartments whereby said main compartment and said subsidiary compartments are adapted to withstand a substantial super-atmospheric pressure and said subsidiary compartments are sealed from said main compartment and from each other, and valve controlled means for intercommunicating the compartments selectively.

27. A pressure cooker comprising a main compartment and a subsidiary compartment mounted within the main compartment and supported in the upper portion thereof, a cover for the main compartment, sealing means adapted simultaneously to seal said main compartment and said subsidiary compartment whereby said main compartment and said subsidiary compartment are adapted to withstand a substantial super-atmospheric pressure and said subsidiary compartment is sealed from said main compartment, and a valve in said cover adapted to connect said main compartment and said subsidiary compartment with each other, said valve comprising a body having a head formed thereon to cooperate with a valve seat and a plurality of intercommunicating bores including a bore communicating with said main compartment, a bore communicating with said subsidiary compartment and an axially extending bore a portion of which forms an inlet to said valve head and which includes a cylindrical part of uniform internal diameter intermediate the ends thereof, a pre-loaded piston valve having a head reciprocable in the said cylindrical part of said last-named bore to an extent varying directly with the pressure developed in the inlet side of said last-named bore, pressure indicating means rendered effective upon movement of said piston valve to indicate the pressure in the said inlet side of said last-named bore, and means to vent the pressure in the said inlet side of said last-named bore rendered effective in response to a predetermined movement of the piston valve under the influence of pressure in the said inlet side of said last-named bore.

References Cited in the file of this patent

UNITED STATES PATENTS

| Number | Name | Date |
| --- | --- | --- |
| 547,590 | Smith | Oct. 8, 1895 |
| 753,118 | Burton | Feb. 23, 1904 |
| 931,155 | Smite | Aug. 17, 1909 |
| 1,106,837 | Pfaehler et al. | Aug. 11, 1914 |
| 1,541,799 | Dodge | June 16, 1925 |
| 1,553,589 | Bargeron | Sept. 15, 1925 |
| 1,737,240 | Hois | Nov. 26, 1929 |
| 1,827,470 | Harrison | Oct. 13, 1931 |
| 1,828,806 | Kania | Oct. 27, 1931 |
| 1,858,294 | Devine | May 17, 1932 |
| 2,024,259 | Troeber et al. | Dec. 17, 1935 |
| 2,218,188 | Wittenberg | Oct. 15, 1940 |